(12) United States Patent
Verkaik et al.

(10) Patent No.: US 6,375,253 B1
(45) Date of Patent: Apr. 23, 2002

(54) OPEN ROOF CONSTRUCTION FOR A VEHICLE AND COVER FRAME FOR ATTACHMENT TO THE UNDERSIDE THEREOF

(75) Inventors: Marcel Verkaik, Delft; Erich Altorf, Wassenaar; Joseph Petrus Johannes Sanders, Cuyk, all of (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/316,155

(22) Filed: May 21, 1999

(30) Foreign Application Priority Data

May 22, 1998 (NL) ............................................. 1009245

(51) Int. Cl.$^7$ ............................. B60J 7/00; B60R 13/02
(52) U.S. Cl. ................................... 296/214; 296/216.07
(58) Field of Search ........................... 296/214, 216.07, 296/216.08

(56) References Cited

U.S. PATENT DOCUMENTS

| | | | |
|---|---|---|---|
| 4,585,269 A | 4/1986 | Lievesley | 296/214 |
| 4,750,781 A | 6/1988 | Betteridge | 296/214 |
| 5,722,715 A * | 3/1998 | Patel et al. | 296/189 |

FOREIGN PATENT DOCUMENTS

| | | | |
|---|---|---|---|
| DE | 94 10 623 U1 | 12/1995 | |
| EP | 0 286 952 A2 | 10/1988 | |
| EP | 0 648 631 A1 | 4/1995 | |
| GB | 2215284 | * 9/1989 | 296/214 |
| WO | 88008375 | * 11/1988 | 296/216.07 |

* cited by examiner

*Primary Examiner*—Dennis H. Pedder
(74) *Attorney, Agent, or Firm*—Westman, Champlin & Kelly, P.A.; S. Koehler

(57) ABSTRACT

An open roof construction for a vehicle having an opening in a fixed roof comprises a frame to be fitted in the opening of the fixed roof. The frame includes a part which extends under the roof of the vehicle, and a cover strip for covering said frame in the interior of the vehicle. The cover strip includes a fixing part of a first material, which is provided with snap portions for fixation to the frame, and an adaptation part of a second, more flexible material, which is connected to said fixing part by a connection, and which is provided on the side remote from the roof opening with a projecting flap whose free end can be brought into engagement with the roof trim of the vehicle. The connection between the mounting element and the adaptation part is provided at a location inwardly of an outer circumference of said fixing part. The adaptation part covers the fixing part completely, seen from below.

14 Claims, 1 Drawing Sheet

OPEN ROOF CONSTRUCTION FOR A VEHICLE AND COVER FRAME FOR ATTACHMENT TO THE UNDERSIDE THEREOF

BACKGROUND OF THE INVENTION

1. Field of the Invention

The invention relates to an open roof construction for a vehicle.

2. Description of the Related Art

An open roof construction is known from German Gebrauchsmuster DE 94 10 623 U1. The cover strip which is used in the open roof construction according to the prior art is provided with a fixing part to be fixed to the frame and an adaptation part which is connected thereto. The adaptation part is connected to the fixing part on the side remote from the opening. The connecting means for connecting the adaptation part to the fixing part are present on the outer circumference of the fixing part. The cover strip must be so connected to the frame that it is vertically adjustable, in order to compensate for the differences in the distance from the underside of the roof trim to the roof that cannot be bridged by the flap of the adaptation part. This makes the construction and the fitting of the cover strip rather complicated.

SUMMARY OF THE INVENTION

The object of the invention is to provide an open roof construction which does not exhibit the aforesaid problems.

In order to accomplish that objective, the open roof construction according to the invention is characterized in that the connecting means between said fixing part and said adaptation part is provided at a location inwardly of the outer circumference of the frame.

This manner of connecting the adaptation part to the fixing part enables a greater adjusting range in a vertical direction of the adaptation part, since the flap will have a larger effective length if a distance between the outer circumference of the frame and the free end of the flap remains constant. An adjusting possibility of the fixing part with respect to the frame will no longer be required in that case.

If the fixing part extends upwards from the connecting means in an the direction of the outer circumference, the flap is given maximum freedom of movement, also in upward direction.

The fixing part is preferably made of a relatively stiff material, so that a solid fixation to the frame of the open roof construction is obtained. The adaptation part, on the other hand, must be made of a more flexible material to enable it to bend through a relatively large angle and engage properly with the roof trim of the vehicle, irrespective of the mounting height of the roof trim. Accordingly, the adaptation part is made of a material which is different, in particular more flexible, from the material of the fixing part.

Any material that possesses a suitable degree of stiffness may be selected as the material for the fixing part and for the adaptation part. For the fixing part, it is preferred to use a material having a relatively large modulus of flexure, for example a mixture of acrylonitrile butadiene styrene (ABS) and polycarbonate (PC) or a similar (co) polymer. For the adaptation part, it is preferred to use a material having a lower modulus of flexure, for example thermoplastic elastomer TPE or a similar (co)polymer.

It is also possible, of course, to realise differences between the flexibility of the fixing part and that of the adaptation part by using different thicknesses or shapes and providing special stiffening features, such as providing ribs, or contrarily by omitting such features.

It is preferred to have the adaptation part cover the fixing part completely, seen from below, because only the adaptation part will be exposed to view in the interior of the vehicle in that case, while other unsightly parts will remain hidden from view.

Furthermore it is preferred for the adaptation part to have a continuous outside surface, which makes it possible to obtain a gradual transition from the adaptation part to the roof trim and realize an aesthetic appearance without any interfering parts being present.

The invention also relates to a cover strip to be fixed to the underside of the frame of the above-described open roof construction.

The invention will be explained in more detail hereafter with reference to the drawing, which schematically shows an embodiment of the invention.

DESCRIPTION OF THE PREFERRED EMBODIMENT

Figure 1:
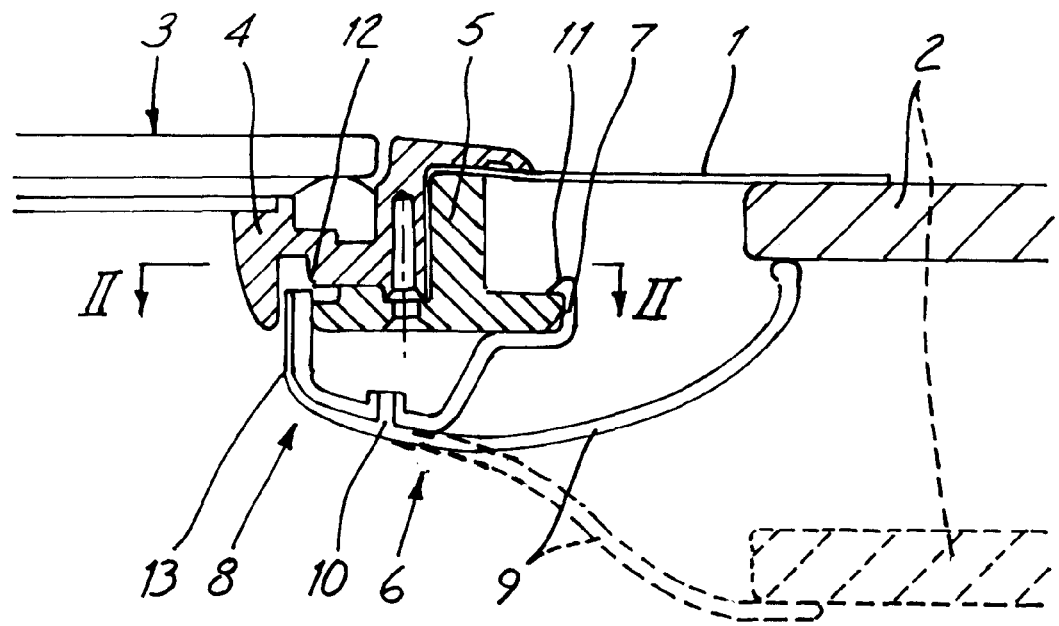
FIG. 1 is a schematic cross-sectional view of a part of a vehicle roof provided with a roof opening and an open roof construction according to the invention, which is mounted therein, showing the roof trim of the vehicle in a high position as well as in a low position (interrupted lines).

FIG. 1 shows part of a fixed roof 1 of a vehicle, for example a passenger car. A roof trim 2 is provided on the inside of the vehicle, which functions to hide the underside of fixed roof 1 from view. An opening is provided in fixed roof 1 as well as in roof trim 2, which opening functions to receive an open roof construction therein.

The open roof construction is provided with a movable closing element 3, in this embodiment in the form of a rigid panel, which may or may not be transparent. The open roof construction is furthermore provided with a frame comprising an outer frame 4 and an inner frame 5. Outer frame 4 is placed into the roof opening from above, after which the inner frame 5 is mounted against said outer frame from below, with fixed roof 1 being clamped between the two frames, thus securing the frame to the fixed roof. A cover strip 6 comprising a fixing part 7 and an adaptation part 8 is fixed to the frame. Adaptation part 8 is provided with an integrated, projecting flap 9, which engages with the underside of roof trim 2 at its free end.

Adaptation part 8 is connected to fixing part 7 by connecting means 10. As FIG. 1 shows, fixing means 11, 12 of fixing part 7 in the form of projecting edges snap round associated edges of inner frame 5.

The connection of adaptation part 8 to fixing part 7 can be realised in several manners. As appears from FIG. 1, adaptation part 8 is provided on the side that faces towards fixing part 7 with projections 10 which are clampingly secured in openings in fixing part 7.

As is shown in FIG. 1, roof trim 2 may be disposed at varying heights. Said height may for example vary according to the type of vehicle. Also the thickness of roof trim 2 may vary. Accordingly, the distance from the underside of roof trim 2 to the fixed roof 1 or to the level at which cover strip 6 is mounted on frame 4, 5 of the open roof construction may vary within certain limits.

FIG. 1 illustrates in full lines a first position of roof trim 2, wherein said roof trim is fixed to the roof 1 of the vehicle. The projecting flap 9 of adaptation part 8 engages with roof trim 2 at its free end. Since the fixing part 7 slopes upwards from connecting means 10 in the direction of the outer circumference, the projecting flap 9 of adaptation part 8 can be brought into engagement with roof trim 2 without coming into contact with the fixing part. This makes it possible to obtain a flowing form of projecting flap 9. The upwardly sloping portion of fixing part 7 could also be made slightly resilient, so that it can yield upon deformation of adaptation part 8.

The broken lines in FIG. 1 illustrate a second position of roof trim 2, wherein said roof trim is fixed to roof 1 at some distance therefrom. Also in this case, projecting flap 9 engages with the underside of roof trim 2, to which end flap 9 has deformed considerably by bending said deformation is readily obtained, due to the flexibility of the material of adaptation part 8.

According to the invention, fixing part 7 and adaptation part 8 are made of different materials, wherein fixing part 7 is made of a relatively stiff material to enable proper fixation to inner frame 5, while adaptation part 8 is made of a considerably more flexible material The materials which are used may for example be a mixture of ABS and PC for fixing part 7 and TPE for the adaptation part 8.

Because of the flexibility of adaptation part 8, a satisfactory engagement of adaptation part 8 on roof trim 2 is obtained in both positions of roof trim 2. Furthermore, the flexibility of adaptation part 8 prevents the occurrence of excessive stresses in the adaptation part 8, as a result of which a flowing form of adaptation part 8 can be obtained in all positions. This is achieved in particular when adaptation part 8 can freely bend from its connections 10 to fixing part 7 until the free end of projecting flap 9, or when the adaptation part has a continuous outside surface. Furthermore it is preferred to have adaptation part 8 abut against fixing part 7 on the other side 13 of connecting means 10. This results in a solid connection as well as an aesthetic appearance. Said appearance can be further enhanced by using styling elements, such as lines, ridges, differences in texture, continued underlying edges in contrasting colors and the like. It is furthermore preferred to have adaptation part 8 completely cover the fixing part 7, and thus the inner frame 8, seen from below.

According to the invention, it is for example possible to bridge a difference in height of at least 45 mm when projecting flap has a length of about 50 mm, measured from the connecting means 10 for connection to fixing part 7 until the free end of flap 9. The underside of roof trim 2 may be disposed at a distance of 10–55 mm from the roof 1 of the vehicle. The connecting means 10 are preferably positioned approximately halfway between the two positions.

When the thickness of projecting flap 9 of adaptation part 8 is the same everywhere, a certain degree of deformation will occur along the length of projecting flap 9. When it is desired to have the deformation take place in particular in the part of the projecting flap 9 near the connection 10 to fixing part 7, the thickness of the projecting flap 9 of adaptation part 8 must be greater at the free end than in the central part. When it is preferred to have said deformation of adaptation part 8 take place at the free end of flap 9, however, said flap must be formed with a smaller thickness at the end. The free end of flap 9 is preferably slightly thickened for stiffening flap 9 and enabling it to retain its form in the circumferential direction thereof.

As is shown in FIG. 1, adaptation part 8 is of substantially cup-shaped cross-section in unloaded condition, comprising two limbs extending from connecting means 10 for attachment to fixing part 7, wherein one limb abuts mainly against fixing part 7 and wherein the second limb forms a projecting flap 9, whose free end can be brought into engagement with the roof trim 2 of a vehicle.

Figure 2:
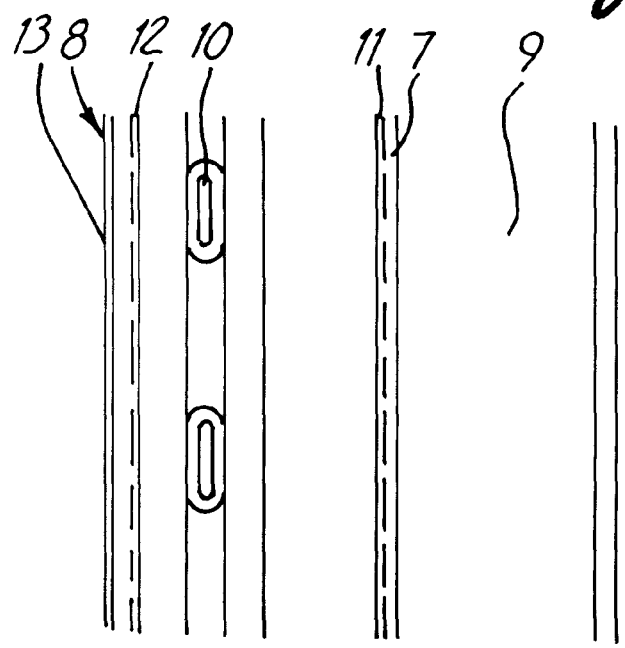
FIG. 2 is a sectional view along line II—II in FIG. 1, wherein the frame is not shown.

FIG. 2 is a view in the direction indicated by arrows II—II in FIG. 1. The Fig. clearly shows spaced-apart connecting means 10, by means of which adaptation part 8 can abet be connected to fixing part 7. In this embodiment, said connecting means 10 comprise openings in fixing part 7 and projections provided on the side of adaptation part 8 that faces towards fixing part 7, wherein said projections, for example heat stakes, can be fitted in said openings.

The above aspects in accordance with the invention make it possible to obtain a cover strip for an open roof construction, wherein said cover strip can be brought into engagement with the roof trim even in those cases where large differences occur in the distance between the roof trim and the vehicle roof. The cover strip can also be used with different types of vehicles exhibiting mutually varying roof trim thicknesses.

The invention is not restricted to the above-described embodiment as shown in the drawing, which can be varied in several ways without departing from the scope of the invention. Thus, the adaptation part may be fixed to the fixing part by means of heat welding. In principle it would also be possible to form the cover strip in one piece from two different materials, for example by injection moulding. Furthermore, the fixing part may for example contain connecting means for connection to the frame in the form of projections which fit in openings of said frame.

We claim:

1. An open roof construction for a vehicle having an opening in a fixed roof, comprising:

a frame to be fitted in the opening of the fixed roof, wherein said frame includes a part which extends under the roof of the vehicle; and a cover strip covering at least said part of said frame in the interior of the vehicle, wherein said cover strip includes:

a fixing strip of a first material, which is provided with at least a fastening portion for fixation to the frame; and an adaptation strip of a second, more flexible material connected to said fixing strip on a side of the fixing strip remote from the roof opening, the adaptation strip having a projecting flap positioned on a side of the fixing strip remote from the roof opening, whose free end can be brought into engagement with a lower surface of a roof trim of the vehicle over a range of angles, the lower surface being positioned at different heights relative to the fixing strip from vehicle to vehicle, and wherein connection of the fixing strip and the adaptation strip is provided at a location inwardly of an outer edge of said fixing strip and said adaptation strip can freely bend from said location.

2. The open roof construction according to claim 1, wherein said fixing strip extends upwards from said location, in a direction to an outer edge of said frame.

3. The open roof construction according to claim 1, wherein said location on said adaptation strip is on a surface facing towards said fixing strip.

4. The open roof construction according to claim 1, wherein said adaptation strip covers said fixing strip completely, seen from below.

5. The open roof construction according to claim 4, wherein said adaptation strip has a continuous outside surface.

6. The open roof construction according to claim 1, wherein said frame comprises:
   an inner frame, which is placed on an inside of the vehicle; and
   an outer frame, which is placed on an outside of the vehicle, wherein said at least one fastening portion of said fixing strip snaps against an edge of said inner frame.

7. The open roof construction according to claim 4, wherein said adaptation strip includes projections on a side facing towards said fixing strip at said location, which projections are fixed in openings in said fixing strip.

8. The open roof construction according to claim 4, wherein said adaptation strip is connected to said fixing strip by heat welding at said location.

9. The open roof construction according to claim 1, wherein a thickness of said projecting flap of said adaptation strip is greater at the free end than in a central portion.

10. An open roof construction for a vehicle having an opening in a fixed roof, comprising:
    a frame to be fitted in the opening of the fixed roof, wherein said frame includes a part which extends under the roof of the vehicle; and
    a cover strip covering at least said part of said frame in the interior of the vehicle, wherein said cover strip includes:
       a fixing strip of a first material coupled to the frame; and
       an adaptation strip of a second, more flexible material connected to said fixing strip at a location on a side of the fixing strip remote from the roof opening, the adaptation strip having a projecting flap positioned on a side of the fixing strip remote from the roof opening, whose free end can be brought into engagement with a lower surface of a roof trim of the vehicle over a range of angles, the lower surface being positioned at different heights relative to the fixing part from vehicle to vehicle, and wherein said adaptation strip can freely bend from said location and covers said fixing strip completely, seen from below.

11. A cover strip to be fixed to the underside of a frame of an vehicle having a fixed roof, comprising:
    a fixing strip of a first material fixed to the frame; and
    an adaptation strip of a second, more flexible material, connected to said fixing strip, wherein said adaptation strip is provided with a projecting flap whose free end can be brought into engagement with a lower surface of a roof trim of a vehicle over a range of angles, the lower surface being positioned at various heights relative to the fixing strip from vehicle to vehicle, wherein a connection of the fixing strip and the adaptation strip is provided at a location inwardly of an outer edge of said fixing strip and the adaptation strip can freely bend from said location.

12. The cover strip according to claim 11, wherein said fixing strip is made of a mixture of ABS and PC and wherein said adaptation strip is made of TPE.

13. The cover strip according to claim 11, wherein said adaptation strip covers said fixing strip on a side proximate the roof opening.

14. An open roof construction for a vehicle having an opening in a fixed roof, comprising:
    a frame to be fitted in the opening of the fixed roof, wherein said frame includes a part which extends under the roof of the vehicle; and
    a cover strip covering at least said part of said frame in the interior of the vehicle, wherein said cover strip includes:
       a fixing strip of a first material, which is provided with at least a fastening portion for fixation to the frame; and
       an adaptation strip of a second, more flexible material connected to said fixing strip at a location on a side of the fixing strip remote from the roof opening, the adaptation strip having a projecting flap positioned on a side of the fixing strip remote from the roof opening, whose free end can be brought into engagement with a roof trim of the vehicle, and wherein said adaptation strip car, freely bend from said location to the free end of said projecting flap, and wherein said adaptation strip abuts against said fixing strip on a side of said location proximate the roof opening.

* * * * *